United States Patent
Simon et al.

(10) Patent No.: US 11,339,725 B2
(45) Date of Patent: May 24, 2022

(54) MECHANICAL REDUCTION GEAR OF AIRCRAFT TURBOMACHINE

(71) Applicant: SAFRAN TRANSMISSION SYSTEMS, Colombes (FR)

(72) Inventors: Adrien Louis Simon, Moissy-Cramayel (FR); Simon Loic Clement Lefebvre, Moissy-Cramayel (FR); Guillaume Pierre Mouly, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 80 days.

(21) Appl. No.: 16/848,642

(22) Filed: Apr. 14, 2020

(65) Prior Publication Data

US 2020/0332721 A1      Oct. 22, 2020

(30) Foreign Application Priority Data

Apr. 16, 2019   (FR) .................................... 1904052

(51) Int. Cl.
*F16H 1/28*   (2006.01)
*F02C 7/36*   (2006.01)

(52) U.S. Cl.
CPC ................ *F02C 7/36* (2013.01); *F16H 1/28* (2013.01); *F05D 2220/323* (2013.01); *F05D 2260/4031* (2013.01); *F16H 2001/2881* (2013.01)

(58) Field of Classification Search
CPC ............... F16H 1/28; F16H 2001/2881; F05D 2220/323; F05D 2260/4031
See application file for complete search history.

(56) References Cited

U.S. PATENT DOCUMENTS

| | | | |
|---|---|---|---|
| 3,188,888 A | 6/1965 | Zink et al. | |
| 3,307,433 A * | 3/1967 | Bennett | F16H 1/46 475/342 |
| 3,640,150 A * | 2/1972 | Leiner | F16H 37/00 475/332 |

(Continued)

FOREIGN PATENT DOCUMENTS

| | | |
|---|---|---|
| DE | 814981 C1 | 9/1951 |
| EP | 3361122 A1 | 8/2018 |

OTHER PUBLICATIONS

French Search Report for FR Application No. 1904052 (with English cover sheet).

*Primary Examiner* — Tisha D Lewis
(74) *Attorney, Agent, or Firm* — Womble Bond Dickinson (US) LLP

(57) ABSTRACT

A mechanical reduction gear for a turbomachine, in particular for an aircraft, this reduction gear including a sun gear having an axis of rotation, a ring gear which extends around the sun gear and which is configured to be fixed in rotation around the axis, planet gears which are in mesh with the sun gear and the ring gear and which are held by a planet carrier which is configured to be fixed or in rotation around the axis, each planet gear including a first toothing of average diameter D1 for the meshing with the sun gear, and a second toothing of average diameter D2, different from D1, for the meshing with the ring gear, wherein the first and second toothings of each planet gear include herringbone teeth and are symmetrical with respect to a plane perpendicular to the axis and passing substantially in the middle of the planet gear.

10 Claims, 3 Drawing Sheets

(56) References Cited

U.S. PATENT DOCUMENTS

| | | | | |
|---|---|---|---|---|
| 4,742,730 A | * | 5/1988 | Dorn | F16H 1/28 |
| | | | | 475/332 |
| 7,291,088 B2 | * | 11/2007 | Arndt | F16H 1/22 |
| | | | | 475/331 |
| 8,622,869 B2 | * | 1/2014 | Mourani | F16H 48/05 |
| | | | | 475/332 |
| 2013/0192264 A1 | | 8/2013 | McCune et al. | |

* cited by examiner

MECHANICAL REDUCTION GEAR OF AIRCRAFT TURBOMACHINE

TECHNICAL FIELD OF THE INVENTION

The present invention concerns the field of the mechanical reduction gears for turbomachines, in particular of aircraft.

BACKGROUND

The prior art comprises in particular documents WO-A1-2010/092263, FR-A1-2 987 416, FR-A1-3 008 462, FR-A1-3 008 462, FR-A1-3 041 054 and U.S. Pat. No. 3,188,888.

The role of a mechanical reduction gear is to change the speed and torque ratio between the input axe and output axe of a mechanical system.

The new generations of dual-flow turbomachines, in particular those with high dilution rate, comprise a mechanical reduction gear to drive the shaft of a fan. Usually, the purpose of the reduction gear is to transform the so-called fast rotation speed of the shaft of a power turbine into a slower rotation speed for the shaft driving the fan.

Such a reduction gear comprises a central pinion, called the sun gear, a ring gear and pinions called planet gears, which are engaged between the sun gear and the ring gear. The planet gears are held by a frame called the planet carrier. The sun gear, the ring gear and the planet carrier are planetary gears because their axes of revolution coincide with the longitudinal axis X of the turbomachine. The planet gears each have a different axis of revolution equally distributed on the same operating diameter around the axis of the planetary gears. These axes are parallel to the longitudinal axis X.

There are several gearbox architectures. In the prior art of double-flow turbomachines, the reduction gears are of the planetary or epicyclic type. In other similar applications, there are so-called differential or compound architectures.

On a planetary reduction gear, the planet carrier is fixed and the ring gear constitutes the output shaft of the device which rotates in the opposite direction to the sun gear.

On an epicyclic reduction gear, the ring gear is fixed and the planet carrier constitutes the output shaft of the device which rotates in the same direction as the sun gear.

On a differential reduction gear, no element is fixed in rotation. The ring gear rotates in the opposite direction of the sun gear and the planet carrier.

The reduction gear can be composed of one or more meshing stages. This meshing is achieved in different ways such as by contact, by friction or by magnetic fields. There are several types of contact meshing, such as straight, helical or herringbone toothings.

The increase in reduction ratios of the architectures of target engines leads to the use of so-called "double stage" reduction gears. Indeed, beyond a ratio of around 7, the so-called "single stage" technology loses its interest because it is no longer compact enough. "Double-stage" reduction gears have therefore to be used.

In a single-stage technology, the same toothing of a planet gear cooperates with the sun gear and the ring gear. In a double stage technology, the toothing of the planet gear that cooperates with the sun gear is different from the toothing of the planet gear that cooperates with the ring gear. In general, the toothings of a planet gear that cooperate with the sun gear and the ring gear respectively have different average diameters.

The main problem with the double-stage reduction gears is the fact that they are asymmetrical with respect to a plane perpendicular to the axis X. Thus, the power entering downstream from the inside and exiting upstream from the outside generates significant moments at the planet gears (the terms "upstream" and "downstream" refer to the general flow of gases in the turbomachine). Also, to gain in compactness and quality of meshing, it is preferable to use helical toothings.

The helical toothings generate significant axial forces at the interfaces between the reduction gear and the engine.

The use of herringbone toothings could solve these axial force problems. However, this does not solve the moments at the bearings and complicates the assembly and manufacture of the reduction gear.

This invention proposes an improvement to this technology which is simple, efficient and economical.

SUMMARY OF THE INVENTION

The invention concerns a mechanical reduction gear of turbomachine, in particular of aircraft, this reduction gear comprising:

a sun gear having an axis of rotation, a ring gear which extends around the sun gear, planet gears which are in mesh with the sun gear and the ring gear and which are held by a planet carrier, each planet gear comprising a first toothing with an average diameter D1 for the meshing with the sun gear, and a second toothing with an average diameter D2, smaller than D1, for the meshing with the ring gear, characterized in that the first and second toothings of each planet gear are symmetrical with respect to a plane perpendicular to said axis and passing substantially through the middle of the planet gear, and in that each of the first and second toothings comprises herringbone teeth, the herringbone of the first toothing being formed by upstream teeth of the first toothing separated from downstream teeth of the first toothing by being arranged on either side of the plane, and the upstream teeth of the second toothing being separated from the downstream teeth of the second toothing by the first toothing.

The use of planet gears with symmetrical toothings makes it possible to solve the aforementioned problem of moments at the bearings of the planet gears. In addition, the toothings of the planet gears are in herringbone to optimise the compactness and the meshing of the reduction gear.

In this patent application, a toothing with herringbone teeth means a toothing comprising two sets of teeth pointing in different directions. The teeth of the first set are inclined with respect to the axis about which the first set extends, and the teeth of the second set of are inclined differently with respect to its axis. The teeth of the two sets are thus inclined with respect to each other to form herringbones.

The reduction gear according to the invention may comprise one or more of the following characteristics, taken separately from one another or in combination with one another:

the upstream teeth of the first toothing are separated by an annular groove from the downstream teeth of this first toothing;

each planet gear comprises a cylindrical body and an annular web extending substantially radially outwards from the middle of this body, the teeth of the second toothing being located at the axial ends of the body, and the teeth of the first toothing being located at the outer periphery of the web;

the sun gear comprises a toothing with herringbone teeth and comprising upstream and downstream teeth located respectively on either side of said plane;

the ring gear comprises a toothing with herringbone teeth and comprising upstream and downstream teeth located respectively on either side of said plane and separated from each other by the second toothing;

the teeth of the ring gear are carried respectively by two rings fixed one to the other on a ring gear carrier;

the ring gear carrier has a general biconic and substantially symmetrical shape with respect to said plane which passes through the middle of the largest diameter of the ring gear carrier;

the ring gear carrier comprises at its ends bearings for guiding the planet carrier or a drive shaft of the planet carrier;

the ring gear is configured to be fixed in rotation around said axis, and the planet carrier is configured to be mobile in rotation around this axis.

The invention furthermore concerns a turbomachine, in particular of an aircraft, comprising a mechanical reduction gear as described above.

BRIEF DESCRIPTION OF THE FIGURES

Other characteristics and advantages will be apparent from the following description of a non-limiting embodiment of the invention with reference to the drawings annexed thereto on which.

DETAILED DESCRIPTION OF THE INVENTION

Figure 1:
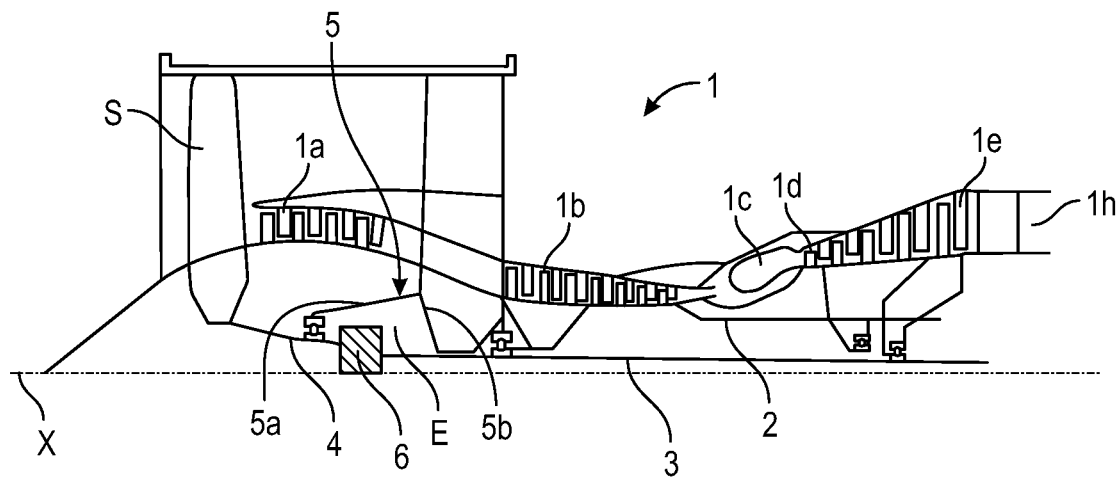
FIG. 1 is a schematic axial cross-sectional view of a turbomachine using the invention.

FIG. 1 describes a turbomachine 1 which conventionally comprises a fan S, a low-pressure compressor 1a, a high-pressure compressor 1b, an annular combustor chamber 1c, a high-pressure turbine 1d, a low-pressure turbine 1e and an exhaust nozzle 1h. The high-pressure compressor 1b and the high-pressure turbine 1d are connected by a high-pressure shaft 2 and form a high-pressure (HP) body with it. The low-pressure compressor 1a and the low-pressure turbine 1e are connected by a low-pressure shaft 3 and form a low-pressure (LP) body with it.

The fan S is driven by a fan shaft 4 which is driven by the LP shaft 3 by means of a reduction gear 6. This reduction gear 6 is usually of the planetary or epicyclic type.

The following description refers to a reduction gear of the epicyclic type, the planet carrier and the sun gear of which are in rotation, the ring gear of the reduction gear being fixed in the reference of the engine.

The reduction gear 6 is positioned in the upstream part of the turbomachine. A fixed structure comprising schematically, here, an upstream part 5a and a downstream part 5b which makes up the engine casing or stator 5 is arranged so as to form an enclosure E surrounding the reduction gear 6. This enclosure E is herein closed upstream by seals at the level of a bearing allowing the passage of the fan shaft 4, and downstream by seals at the level of the passage of the LP shaft 3.

Figure 2:
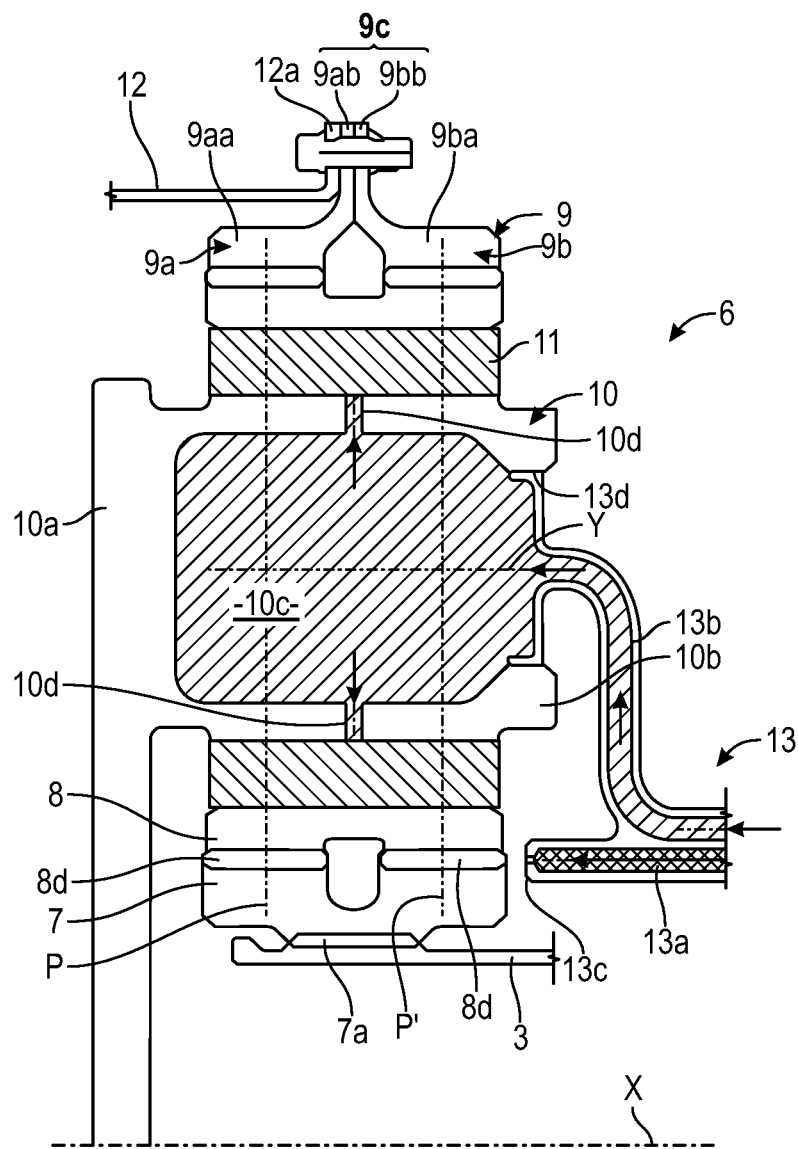
FIG. 2 is a partial axial cross-sectional view of a mechanical reduction gear.

FIG. 2 shows an epicyclic reduction gear 6. The reduction gear 6 is connected on the input side to the LP shaft 3, e.g. via internal splines 7a. In this way, the LP shaft 3 drives a planetary pinion called the sun gear 7. Classically, the sun gear 7, whose axis of rotation is combined with that of the turbomachine X, drives a set of pinions called planet gears 8, which are equally distributed on the same diameter around the axis of rotation X. This diameter is equal to twice the operating centre distance between the sun gear 7 and the planet gears 8. The number of planet gears 8 is generally defined between three and seven for this type of application.

The assembly of planet gears 8 is held by a frame called planet carrier 10. Each planet gear 8 rotates around its own axis Y, and meshes with the ring gear 9.

On the output side we have:

In this epicyclic configuration, the set of the planet gears 8 drives the planet carrier 10 around the axis X of the turbomachine. The ring gear is fixed to the engine casing or stator 5 via a ring gear carrier 12 and the planet carrier 10 is fixed to the fan shaft 4.

In another planetary configuration, the set of the planet gears 8 is held by a planet carrier 10 which is attached to the engine casing or stator 5. Each planet gear drives the ring gear which is brought back to the fan shaft 4 via a ring gear carrier 12.

In another differential configuration, the set of the planet gears 8 is held by a planet carrier 10 which is connected to a first fan shaft 5. Each planet gear drives the ring gear, which is brought back to a second, counter-rotating fan shaft 4 via a ring gear carrier 12.

Each planet gear 8 is mounted freely in rotation by means of a bearing 11, e.g. of the rolling or hydrodynamic bearing type. Each bearing 11 is mounted on one of the axes 10b of the planet carrier 10 and all the axes are positioned relative to each other by means of one or more structural frames 10a of the planet carrier 10. There is a number of axes 10b and bearings 11 equal to the number of planet gears. For operational, mounting, manufacturing, control, repair or replacement reasons, the axes 10b and the frame 10a can be separated into several parts.

For the same reasons as mentioned above, the toothing of a planet gear can be separated into several helixes or teeth, each having a median plane P, P'. In our example, we detail the operation of a reduction gear of which each planet gear comprises two sets of herringbone teeth cooperating with a ring gear separated into two half-ring gears:

An upstream half ring gear 9a consisting of a rim 9aa and a mounting half-flange gab. On the rim 9aa is the front helix meshed with a helix of the toothing 8d of each planet gear 8. The helix of the toothing 8d also meshes with that of the sun gear 7.

A downstream half-ring gear 9b consists of a rim 9ba and a mounting half-flange 9bb. On the rim 9ba is the rear helix meshed with a helix of the toothing 8d of each planet gear 8. The helix of the toothing 8d also meshes with that of the sun gear 7.

If the widths of helixes vary between the sun gear 7, the planet gears 8 and the ring gear 9 because of the toothing overlaps, they are all centred on a median plane P for the upstream teeth and on another median plane P' for the downstream teeth.

FIG. 2 thus illustrates the case of a reduction gear with a single meshing stage, i.e. the same toothing 8*d* of each planet gear 8 cooperates with both the sun gear 7 and the ring gear 9. Even if the toothing 8*d* comprises two sets of teeth, these teeth have the same average diameter and form a single and same toothing called a herringbone.

The mounting half-flange gab of the upstream ring gear 9*a* and the mounting half-flange 9*bb* of the downstream ring gear 9*b* form the mounting flange 9*c* of the ring gear. The ring gear 9 is fixed to a ring gear carrier by assembling the mounting flange 9*c* of the ring gear and the mounting flange 12*a* of the ring gear carrier using a bolted assembly for example.

The arrows in the FIG. 2 describe the supplying of oil in the reduction gear 6. The oil reaches the reduction gear 6 from the stator part 5 into a distributor 13 by different means which will not be specified in this view because they are specific to one or more types of architecture. The distributor 13 comprises injectors 13*a* and arms 13*b*. The function of the injectors 13*a* is to lubricate the toothing and the function of the arms 13*b* is to lubricate the bearings. The oil is fed to the injector 13*a* to exit through the end 13*c* to lubricate the toothing. The oil is also fed to the arm 13*b* and flows through the supply port 13*d* of the bearing. The oil then flows through the axis into a buffer zone(s) 10*c* and to exit the holes 10*d* to lubricate the bearings of the planet gear.

Figure 3:
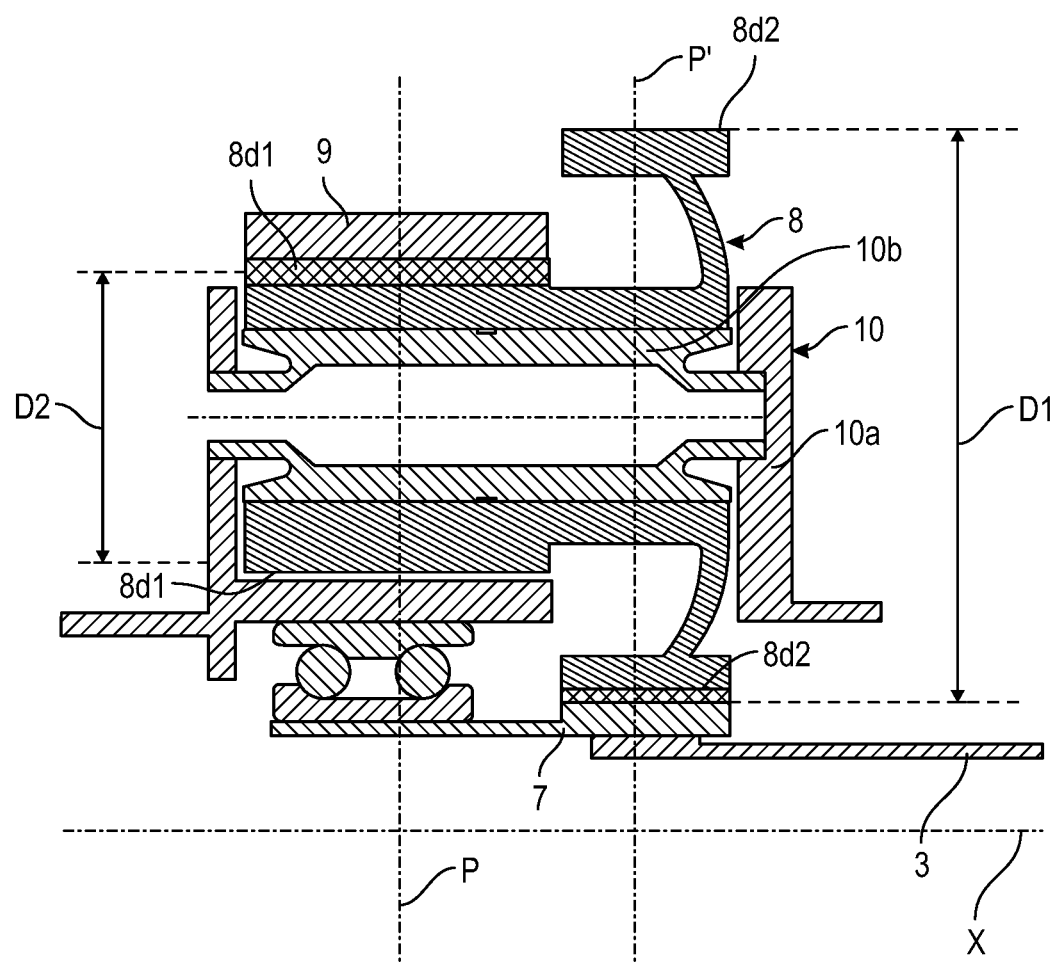
FIG. 3 is another partial axial cross-sectional view of a mechanical reduction gear, and illustrates the technique prior to the present invention.

FIG. 3 shows another example of reduction gear architecture, known as a double stage meshing, in which each planet gear 8 comprises two separate toothings 8*d*1, 8*d*2 configured to cooperate with the ring gear 9 and the sun gear 7, respectively.

In this FIG. 3, the elements already described in the above are designated by the same references.

The toothing 8*d*1 for the meshing with the ring gear 9 has an average diameter noted D2 and is located in a median plane P. The toothing 8*d*2 for the meshing with the sun gear 7 has an average diameter noted D1 and is located in another median plane P'. The median planes P, P' are parallel to each other and perpendicular to the axis X. The diameter D2 is smaller than the diameter D1. Finally, each toothing 8*d*1, 8*d*2 comprises here a single helix.

As mentioned in the above, this "double-stage" architecture generates significant moments at the level of the planet gears 8.

Figure 4:
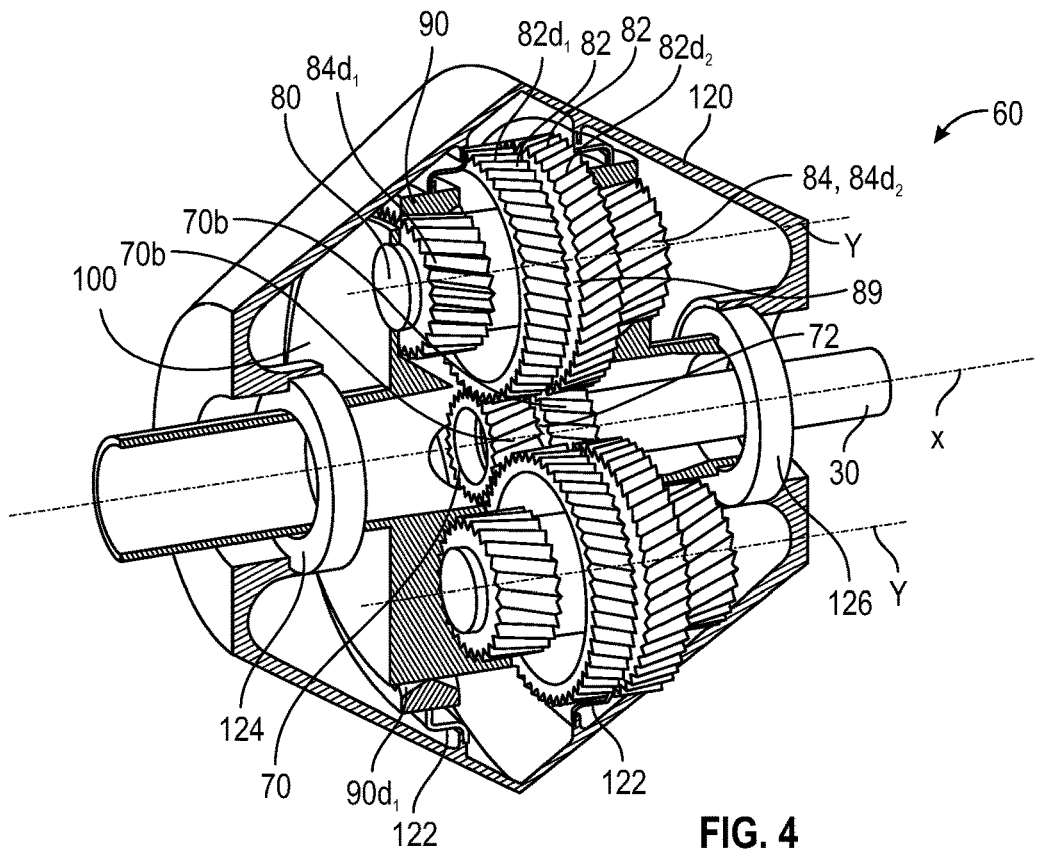
FIG. 4 is a schematic axial section and perspective view of a reduction gear according to the invention.
Figure 5:
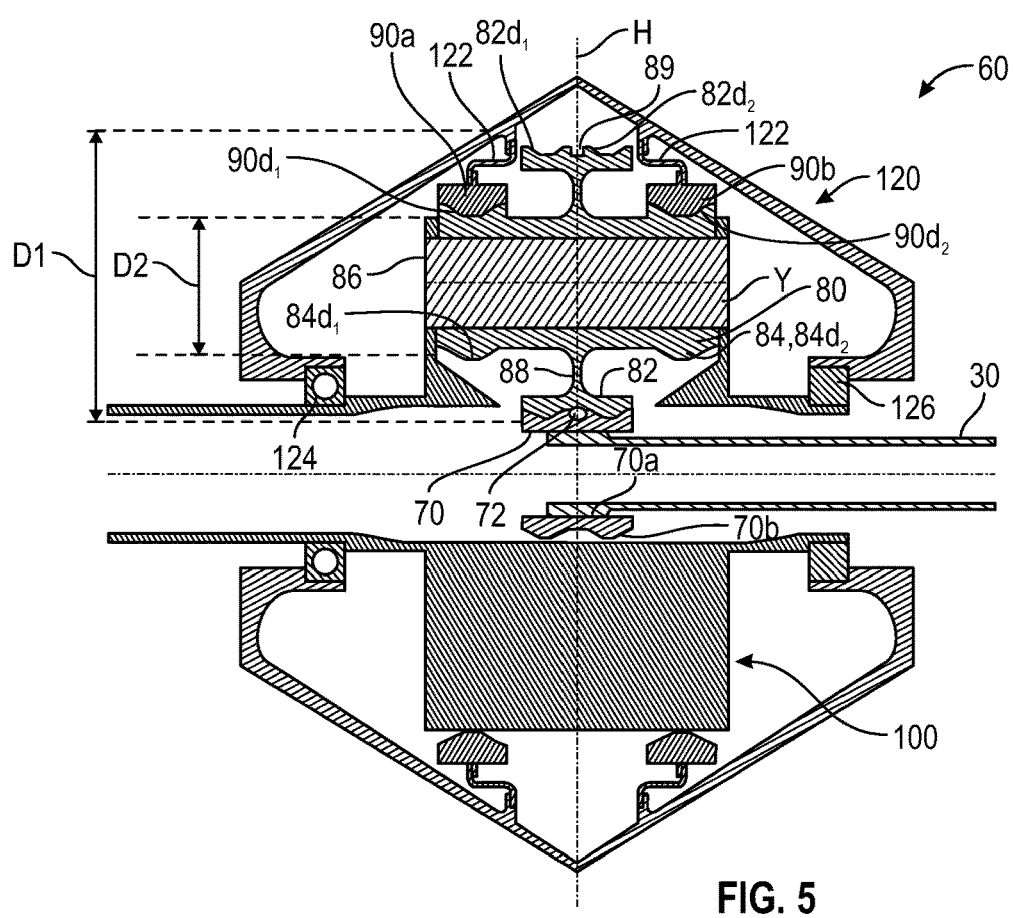
FIG. 5 is another schematic axial cross-sectional view of the reduction gear in FIG. 4.

The present invention proposes to solve this problem by means of planet gears with double-stage and with symmetrical toothings, a preferred embodiment of the invention being represented in FIGS. 4 and 5.

The reduction gear 60 in FIGS. 4 and 5 comprises:
a sun gear 70 having an axis of rotation X,
a ring gear 90 which extends around the sun gear and which is configured to be stationary in rotation around the axis X, and
planet gears 80 which are meshed with the sun gear 70 and the ring gear 90 and which are held by a planet carrier 100 which is configured to be in rotation around the axis X.

The plane H is defined as a median plane perpendicular to the axis X and passing substantially in the middle of the reduction gear 60 (FIG. 5).

The sun gear 70 comprises internal splines 70*a* for coupling with the LP shaft 30 and external toothing 70*b* for the meshing with the planet gears 80. The toothing 70*b* has two sets of adjacent herringbone teeth separated from each other by an annular groove 72 directed radially outwards. The toothing 70*b* is symmetrical with respect to the plane H, its teeth being located on either side of the plane H which passes through the groove 72.

The ring gear 90 is formed by two independent rings 90*a*, 90*b* and comprises a toothing which is separated into two sets of herringbone teeth 90*d*1, 90*d*2 carried respectively by the two rings.

The rings 90*a*, 90*b* are arranged symmetrically with respect to the plane H which therefore extends between these rings. The rings are connected and fixed to a ring gear carrier 120 by means of the connecting annular shrouds 122. The shrouds 122 are independent of each other, each shroud having in axial half-section a general S-shape giving it a certain radial flexibility by elastic deformation during operation.

Each ring 90*a*, 90*b* extends around the axis X and is fixed to the corresponding shroud 122 by its outer periphery. Its inner periphery comprises one of the teeth 90*d*1, 90*d*2.

In the example shown, which is not limited to, the ring gear carrier 120 has a general annular shape around the axis X and more particularly a biconical shape. It thus comprises a first upstream or left-hand (on the drawing) portion, with an upstream end of smaller diameter, and a downstream end of larger diameter which is connected to the upstream end of larger diameter of the other, downstream or right-hand (on the drawing) portion. The larger-diameter ends of the portions are thus connected to each other, and their smaller-diameter ends form the axial ends of the ring gear carrier.

The upstream end of the ring gear carrier 120 extends around the planet carrier 100 or a shaft connected to this planet carrier, and is centred and guided in rotation on the planet carrier or the shaft via at least one bearing 124. Similarly, the downstream end of the ring gear carrier 120 extends around the planet carrier 100 or a shaft connected to this planet carrier, and is centred and guided in rotation on the planet carrier or the shaft via at least one further bearing 126.

As in the case of the ring gear 90, the ring gear carrier 120 is symmetrical with respect to the plane H which intersects the ring gear carrier in its centre and thus passes through the larger diameter ends of the above-mentioned portions.

Each planet gear 80 has a first toothing 82 with a mean diameter D1 for the meshing with the sun gear 70, and a second toothing 84 with a mean diameter D2, different from D1 and in particular smaller than D1, for the meshing with the ring gear 90. The average diameters are measured from the axis Y of each planet gear and represent the average between the maximum and minimum diameter of a toothing of this planet gear.

Each planet gear 80 comprises a cylindrical body 86 and an annular web 88 extending substantially radially outwards from the middle of this body 86. The toothing 84 is divided into two sets of herringbone teeth 84*d*1, 84*d*2 which are located respectively on the axial ends of the body 86. The toothing 82 comprises two sets of herringbone teeth 82*d*1, 82*d*2 which are located on the outer periphery of the web 88 and which are separated from each other by an annular groove 89 opening radially outwards with respect to the axis Y.

The toothing 82 is traversed in its centre by the plane H which passes through the groove 89, the teeth 82*d*1, 82*d*2 thus being arranged on either side of the plane H. The teeth 84*d*1, 84*d*2 are also arranged symmetrically with respect to the plane H.

The toothing 82 and the outer periphery of the web 88 have an axial dimension which is smaller than the axial distance between the rings 90*a*, 90*b* and between the shrouds 122, so that each planet gear 80 can freely rotate in the ring gear carrier 120 and between the rings 90a, 90b and the shrouds 122.

The solution thus proposes to "symmetrize" toothings of the planet gears of the reduction gear in order to symmetrize the axial forces and the moments to which the planet gears are subjected during operation. This solution also makes it possible to gain in length or axial dimension in relation to a herringbone toothing by eliminating the inter-toothing cove of the meshing stage with the ring gear.

This solution is particularly compatible with:
- an "epicyclic" use of rotating planet carrier and fixed ring gear;
- a "planetary" use of rotating ring gear and fixed planet carrier.
- a "differential" use of rotating ring gear and planet carrier.
- bearings with rolling elements and also hydrodynamic bearings.
- a one-piece or multi-part planet carrier.

The invention claimed is:

1. A mechanical reduction gear for a turbomachine, said reduction gear comprising:
    a sun gear having an axis of rotation,
    a ring gear which extends around the sun gear,
    planet gears which are in mesh with the sun gear and the ring gear and which are held by a planet carrier, each planet gear comprising a first toothing with an average diameter D1 for the meshing with the sun gear, and a second toothing with an average diameter D2, different from D1, for the meshing with the ring gear, each of the first and second toothings comprising herringbone teeth,
    wherein the first and second toothings of each planet gear are symmetrical with respect to a plane perpendicular to said axis and passing through a middle of the planet gear,
    and in that the herringbone of the first toothing is formed by upstream teeth of the first toothing separated from downstream teeth of the first toothing by being arranged on either side of the plane, and an upstream teeth of the second toothing are separated from a downstream teeth of the second toothing by the first toothing,
    wherein each planet gear comprises a cylindrical body and an annular web extending radially outwards from a middle of this body, the teeth of the second toothing being located at an axial ends of the body, and the teeth of the first toothing being located at an outer periphery of the web.

2. The mechanical reduction gear according to claim 1, wherein the upstream teeth of the first toothing are separated by an annular groove from the downstream teeth of this first toothing.

3. The mechanical reduction gear according to claim 1, wherein the sun gear comprises a toothing with herringbone teeth and comprising upstream and downstream teeth located respectively on either side of said plane.

4. The mechanical reduction gear according to claim 1, wherein the ring gear comprises a toothing with herringbone teeth and comprising upstream and downstream teeth located respectively on either side of said plane and separated from each other by the second toothing.

5. The mechanical reduction gear according to claim 4, wherein the teeth of the ring gear are carried respectively by two rings fixed one to the other on a ring gear carrier.

6. The mechanical reduction gear according to claim 1, wherein the ring gear is configured to be fixed in rotation around said axis, and the planet carrier is configured to be mobile in rotation around this axis.

7. A turbomachine comprising the mechanical reduction gear according to claim 1.

8. A mechanical reduction gear for a turbomachine, said reduction gear comprising:
    a sun gear having an axis of rotation,
    a ring gear which extends around the sun gear,
    planet gears which are in mesh with the sun gear and the ring gear and which are held by a planet carrier, each planet gear comprising a first toothing with an average diameter D1 for the meshing with the sun gear, and a second toothing with an average diameter D2, different from D1, for the meshing with the ring gear, each of the first and second toothings comprising herringbone teeth,
    wherein the first and second toothings of each planet gear are symmetrical with respect to a plane perpendicular to said axis and passing through a middle of the planet gear,
    wherein the herringbone of the first toothing is formed by upstream teeth of the first toothing separated from downstream teeth of the first toothing by being arranged on either side of the plane, and an upstream teeth of the second toothing are separated from a downstream teeth of the second toothing by the first toothing,
    wherein the ring gear comprises a toothing with herringbone teeth and comprising upstream and downstream teeth located respectively on either side of said plane and separated from each other by the second toothing,
    wherein the teeth of the ring gear are carried respectively by two rings fixed one to the other on a ring gear carrier, and
    wherein the ring gear carrier has a general biconic and symmetrical shape with respect to said plane which passes through a middle of a largest diameter of the ring gear carrier.

9. The mechanical reduction gear according to claim 8, wherein the ring gear carrier comprises at its ends bearings for guiding the planet carrier or a drive shaft of the planet carrier.

10. A turbomachine comprising the mechanical reduction gear according to claim 8.

* * * * *